Sept. 29, 1964 A. H. BOBECK 3,151,316

MAGNETIC DATA STORAGE SYSTEM

Filed Oct. 30, 1959 2 Sheets-Sheet 1

INVENTOR
A. H. BOBECK
BY Kenneth B. Hamlin
ATTORNEY

INVENTOR
A. H. BOBECK
BY Kenneth B Hamlin
ATTORNEY

United States Patent Office 3,151,316

Patented Sept. 29, 1964

3,151,316

MAGNETIC DATA STORAGE SYSTEM

Andrew H. Bobeck, Chatham, N.J., assignor to Bell Telephone Laboratories, Incorporated, New York, N.Y., a corporation of New York Filed Oct. 30, 1959, Ser. No. 849,982
14 Claims. (Cl. 340—174)

This invention relates to data storage systems and more particularly to such systems employing magnetic data storage media.

Magnetic data storage media such as magnetic tapes and magnetic drums are well known in the art. In general these comprise a movable surface on which a thin layer of magnetic material has been deposited. A magnetic head is used to magnetize small incremental areas or spots termed "cells" on the magnetic surface, and the resulting flux in each cell points in one of two directions to indicate a two-valued (binary) condition. The sensing of a stored bit of information is accomplished by means of relative motion between the magnetic surface and the same or a similar magnetic head. The flux lines that pass through the head as the magnetic surface moves past the head induce in a coil wound on the head a voltage that is proportional to the rate of change of this flux. The polarity of the induced voltage indicates whether a binary "1" or a binary "0" has been sensed. Alternatively, binary information may be recorded on a magnetic storage medium as the presence or absence of magnetized spots, and correspondingly the information is sensed by the presence or absence of induced voltages in the magnetic head as the magnetic medium is moved past the head.

Certain terms have been generally accepted in discussing magnetic data storage media, and for convenience these terms are set forth at this point. A "cell" is an incremental area of a magnetizable surface in which a single bit of information is stored. Accordingly, one head is effective upon only one cell directly under the head at any instant. The aggregate of the cells which pass under a magnetic head is referred to as a "track" while the aggregate of cells is different tracks which pass simultaneously under a specified group of heads is referred to as a "slot." Magnetic data storage media are further classified as "bit organized" and "word organized." In the former the individual cells of a magnetic medium which store the individual binary bits are sequentially sensed a cell at a time, whereas in the latter the cells which store the binary bits comprising "each word" are grouped and sensed in parallel.

Because the sensing of magnetic conditions recorded on the surface of a magnetic data storage medium in the manner indicated above requires relative motion between a head and the magnetic surface, these media for the most part have taken the form of magnetic drums or magnetic tapes. Systems are known, however, wherein information stored on a magnetic medium is statically sensed without lateral movement of the medium with respect to a magnetic head. The problems involved in the static sensing of magnetically recorded information at reasonable bit densities are great and hence this method of sensing magnetically stored information has not been utilized to any degree. The attractiveness of the static sensing of magnetically recorded information is further limited in many applications by the fact that motion is needed to gain access to the different storage locations of the medium regardless of whether this motion is utilized for sensing. Without this movement, a magnetic head is required for each cell to be statically sensed. The known methods for statically sensing magnetically recorded data comprise generally an arrangement for varying the reluctance in the magnetic path of a head which is linking the lines of a flux emanating from a magnetized cell on the surface of a magnetic medium, or an arrangement for vibrating or oscillating a magnetic head in a direction normal to the surface of a magnetic medium from which the lines of flux emanate. Both of these arrangements require a magnetic head per bit of information if no relative lateral movement between the medium and the head is provided. Thus these systems are expensive in that a large number of heads are required. Furthermore, these systems require considerable complicated and costly control circuitry.

One further disadvantage of systems employing magnetic storage media, particularly of such systems employing magnetic drums and magnetic tapes, resides in the access time required to write or read a particular bit of information. This relatively long access time is one of the disadvantages of such systems that has prevented the adoption of magnetic tapes and/or magnetic drums as memories in computers and data processing systems where short access times are required.

It is a general object of this invention to provide an improved magnetic data storage system.

It is a more specific object of this invention to reduce the time required for access to data recorded on magnetic data storage media.

It is a further object of the invention to provide an improved magnetic data storage system wherein the magnetically recorded data may be statically sensed without relative lateral movement of the magnetic storage medium with respect to a transducer.

It is also an object of the invention to provide an improved magnetic data storage system wherein movement of the magnetic storage medium with respect to a transducer to obtain access to different storage locations on the storage medium is not required.

These and other objects of this invention are attained in illustrative embodiments wherein information is recorded on a magnetizable medium as binary conditions and wherein a transducer structure comprising a plurality of electrical conductors spaced apart and attached to a magnetostrictive rod is positioned adjacent the magnetizable medium such that the respective conductors link the magnetic flux lines emanating from respective information cells of the medium. An electromechanical transducer launches an acoustic wave in the magnetostrictive rod which propagates from one end of the rod to the other. As the acoustic wave propagates past each of the conductors attached to the rod, the conductors are displaced and cut the magnetic flux lines emanating from the respective cells of the magnetizable medium. A voltage pulse is induced in the individual conductors in response to the cutting of these flux lines, which pulse has a polarity indicative of the information read from the magnetizable medium.

It is a feature of this invention that an electrical conductor positioned adjacent the surface of a magnetizable medium be displaced to cut the flux lines emanating from an information cell of the medium to sense the magnetic condition thereof by propagating a mechanical wave down an elongated member to which the conductor is attached.

It is also a feature of this invention that data recorded in a plurality of cells of a magnetizable medium be sequentially sensed a cell at a time by successively displacing a plurality of electrical conductors each positioned in the magnetic flux emanating from a respective one of the cells when a mechanical wave is propagated down an elongated member to which the electrical conductors are attached.

It is an additional feature, in accordance with an aspect of the invention, that data recorded in a plurality of cells of a magnetizable medium be sequentially sensed a cell at a time by sequentially displacing successive portions of an electrical conductor helically wound about an elongated mechanical wave transmission member and positioned such that the successive portions of the electrical conductor cut the lines of magnetic flux emanating from respective ones of the cells of the magnetizable medium when a mechanical wave is propagated down the elongated member.

It is a further feature, in accordance with an aspect of the invention, that information cells of a magnetizable medium be arranged in rows and columns on a "bit organized" basis, that a transducer structure comprising a mechanical wave transmission member having a plurality of electrical conductors attached thereto be positioned adjacent each row of cells with each of the electrical conductors thereof linking the magnetic flux lines emanating from a respective cell, that the electrical conductors of all of the respective transducer structures positioned with respect to cells of each column be parallelly interconnected in a columnar manner, and that mechanical waves be launched in all of the transmission members of the respective transducer structures to displace successively each of the parallelly interconnected electrical conductors thereby sequentially sensing in a serial manner the information bits recorded in all of the cells of the magnetizable medium.

It is a feature, in accordance with another aspect of the invention, that information cells of a magnetizable medium be arranged in rows and columns on a "word organized" basis with each row of cells containing the binary bits of each word, that a transducer structure comprising a mechanical wave transmission member having a plurality of series connected electrical conductors attached thereto be positioned adjacent each row of cells with each of the electrical conductors thereof linking the magnetic flux lines emanating from a respective cell, and that mechanical waves be selectively launched in the transducer structures to displace successively the series connected electrical conductors thereby sequentially sensing the binary bits of selected words recorded in the magnetizable medium.

The foregoing and other objects and features of the present invention will be more readily understood from the following description of illustrative embodiments thereof when read in reference to the accompanying drawing, in which.

Figure 1:
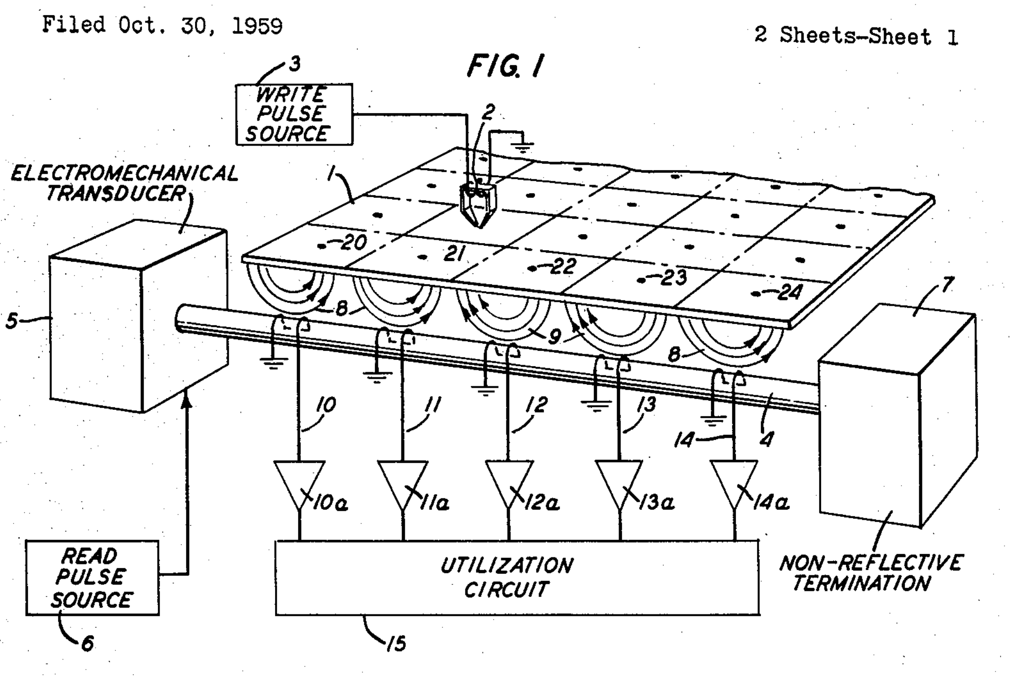
FIG. 1 depicts one illustrative embodiment of the present invention.

Referring now to the drawing, FIG. 1 shows an illustrative embodiment of a magnetic data storage system incorporating the principles of the invention which includes a magnetizable medium 1 on which binary information may be recorded as two-valued magnetic conditions. Magnetizable medium 1 may be the magnetizable surface of a magnetic drum or magnetic tape or advantageously a thin plate of magnetizable material or a thin film of magnetizable material deposited on a suitable nonmagnetic base. In the event that medium 1 is the magnetizable surface of a magnetic drum or tape, information may be magnetically recorded thereon in the manner known in the art by conventional magnetic recording heads. This information may then advantageously be read in accordance with this invention, in the manner to be described. Alternatively, if medium 1 is a thin plate or thin film of magnetizable material, information may advantageously be recorded, in a manner known in the art, on one side of medium 1 by one or more stationary or movable magnetic heads such as head 2 when energized by a suitable source 3 of write current pulses. This information may then advantageously be read in accordance with the invention from the opposite side of medium 1 in the manner to be described. For illustrative purposes, medium 1 is shown divided by dotted lines into a plurality of information cells, the cells being arranged into rows and columns or, in the event that medium 1 is the magnetizable surface of a magnetic drum or tape, the cells are illustrated as comprising tracks and slots as defined hereinbefore.

The information magnetically recorded on medium 1 is read in accordance with the invention by a transducer structure including a magnetostrictive rod 4, which rod may be made of any suitable material capable of propagating an acoustic wave. Attached to one end of rod 4 is an electromechanical transducer 5 which transduces an electrical pulse from pulse source 6 into an acoustic wave which propagates the length of rod 4. On the opposite end of rod 4 is a non-reflective termination 7 which is made of any suitable energy absorbing material to prevent unwarranted wave reflections in rod 4. Attached to rod 4, and insulated therefrom in the event that rod 4 is made of electrically conducting material, are a plurality of conductors 10, 11, 12, 13, and 14. These conductors are spaced along rod 4 and positioned adjacent the surface of magnetizable medium 1 such that conductor links the magnetic flux lines (shown schematically as lines 8 or 9) emanating from a respective cell in magnetizable medium 1. Each of conductors 10 through 14 is connected through an associated amplifier 10*a* through 14*a*, respectively, to utilization circuit 15.

As an acoustic pulse, launched in rod 4 by transducer 5 in response to an electrical pulse from pulse source 6, propagates down the length of rod 4, conductors 10 through 14 are successively displaced to cut the magnetic flux lines emanating from the respective cells of medium 1. As each of these conductors cuts the flux lines emanating from its respective cell, a voltage pulse is induced in the conductor which has a polarity indicative of whether a binary "1" or a binary "0" has been recorded on magnetizable medium 1. This voltage pulse is amplified by the respective amplifier and applied to utilization circuit 15.

Assume, for example, that cells 20 through 24 in the first row or slot of cells in magnetizable medium 1 have been magnetized, in the manner described hereinbefore, to record the binary values 11001. The flux lines emanating from these respective cells are shown schematically as lines 8 and 9 in FIG. 1. It will be noted that the flux lines 8 emanating from cells 20, 21 and 24 in which binary "1" is recorded are in one direction, to the right as shown in the drawing, while the flux lines 9 emanating from cells 22 and 23 in which a binary "0" is recorded are in the opposite direction. Hence, as an acoustic pulse propagates the length of rod 4, voltage pulses are successively induced in conductors 10 through 14 with the polarity of the pulses indicating a binary "1" being opposite to the polarity of the pulses indicating a binary "0."

Figure 2:
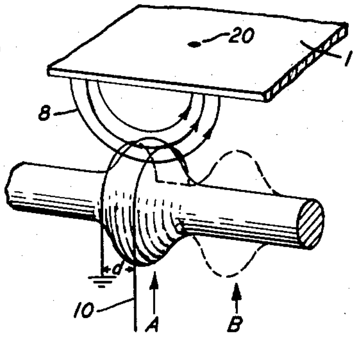
FIG. 2 is an enlarged view of a portion of the embodiment shown in FIG. 1 and shows in greater detail an illustrative manner in which an electrical conductor may be attached to a magnetostrictive rod and the manner in which this conducor is displaced by the propagation of an acoustic pulse in the magnetostrictive rod.

One illustrative manner in which the respective conductors 10 through 14 may advantageously be placed on and attached to rod 4 and the manner in which these conductors are displaced when an acoustic wave propagates the length of rod 4 are shown in greater detail in FIG. 2. FIG. 2 shows an enlarged view of cell 20 of magnetizable medium 1 and a portion of rod 4 with conductor 10 attached thereto. As shown in FIG. 2, conductor 10 is looped over and attached to the upper cylindrical surface of rod 4 in a manner such that it provides two oppositely wound half windings serially connected and spaced apart a distance *d*. When an acoustic wave propagates down a member capable of supporting such a wave, the cross-sectional area of successive portions of the member are successively expanded and contracted. This is shown in an exaggerated manner in FIG. 2 wherein the acoustic wave propagating in rod 4 from left to right is shown at position A. As the wave propagates down the rod it will move to position B and on down the rod at substantially the speed of sound. As illustrated in FIG. 2, when the crest of the acoustic wave reaches the point where the first half winding formed by conductor 10 is attached to rod 4, this half winding will be displaced from its normal position toward the surface of magnetizable medium 1 and in so doing will cut the magnetic flux lines 8 emanating from cell 20. The cutting of flux lines 8 by the first half winding formed by conductor 10 will result in a voltage being induced in conductor 10 which has a given polarity depending upon the direction of flux lines 8. As the acoustic wave propagates further down rod 4 and rod 4 is returned to its normal cross-sectional area, the second half winding of conductor 10 cuts the magnetic flux lines 8 in the opposite direction. Due to the reversal in the direction of the second half winding from that of the first half winding formed by conductor 10, the voltage induced in conductor 10 when both half windings cut magnetic flux lines 8 will be additive and hence a voltage pulse is induced in conductor 10. The distance *d* between the first half winding and second half winding formed by conductor 10 depends upon the propagating characteristics of the particular material from which rod 4 is made and is advantageously selected such that the two voltages induced in conductor 10 as the acoustic wave propagates past the successive half windings are additive to produce a voltage pulse.

Figure 3:
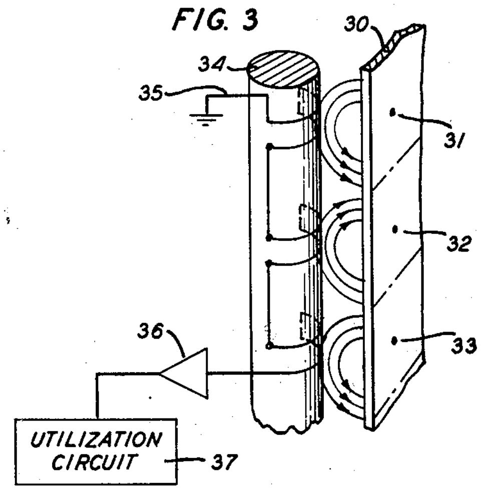
FIG. 3 depicts an illustrative manner in which an electrical conductor may be attached to a magnetostrictive rod to sense sequentially a plurality of information cells in a magnetizable medium when an acoustic pulse is propagated in the rod.

FIG. 3 shows an illustrative manner in which a plurality of information cells in a magnetizable medium may advantageously be sensed in accordance with the invention to produce a series of voltage pulses on a single lead such that the polarity of the respective pulses in the series is indicative of the binary bit recorded in respective cells of the medium. As shown in FIG. 3, magnetizable medium 30 containing three information cells 31, 32 and 33 is located adjacent magnetostrictive rod 34 to which a conductor 35 is attached. One end of conductor 35 is connected to ground and is then attached to rod 34 in the manner similar to that described above with reference to FIG. 2 such that it provides two oppositely wound half windings which link the magnetic flux emanating from cell 31. Conductor 35 is then extended along rod 34 to provide two oppositely wound half windings which link the magnetic flux emanating from cell 32. Similarly, conductor 35 is further extended along the rod 34 to provide two oppositely wound half windings which link the magnetic flux emanating from cell 33. Conductor 35 then extends to amplifier 36 which in turn is connected to utilization circuit 37. Although the arrangement shown in FIG. 3 utilizes a single conductor 35, it is apparent that a plurality of conductors such as conductors 10 through 14 described above in connection with FIG. 1 may be serially connected in a similar manner.

When an acoustic wave is propagated down rod 34 from the top to the bottom as shown in FIG. 3 in a manner similar to that described hereinbefore, the two half windings formed by conductor 35 which link the flux lines emanating from cell 31 will be displaced to cut these flux lines and a voltage pulse will be induced in conductor 35. This pulse is amplified in amplifier 36 and applied to utilization circuit 37. As the acoustic wave propagates on down the rod, the two half windings formed by conductor 35 which link the flux lines emanating from cell 32 will be displaced to cut these flux lines and a voltage pulse is again induced in conductor 35, amplified in amplifier 36 and applied to utilization circuit 37. Similarly, as the acoustic wave propagates still further down the rod, the two oppositely wound half windings formed by conductor 35 which link the magnetic flux lines emanating from cell 33 are displaced to cut these flux lines and a third voltage pulse is induced in conductor 35 which is amplified in amplifier 36 and applied to utilization circuit 37. Due to the difference in propagating times for the voltage pulses applied to conductor 35 and the propagating time for the acoustic wave traveling down rod 34, successive voltage pulses will be applied to amplifier 36 and utilization circuit 37. The polarity of these successive pulses will indicate respectively the value of the binary bits recorded in the respective cells 31, 32 and 33 of magnetizable medium 30.

Figure 4:
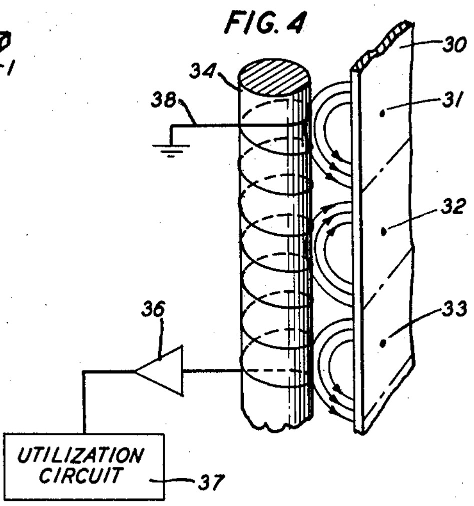
FIG. 4 shows an alternative manner of attaching a conductor to the magnetostrictive rod in the embodiment of FIG. 3.

FIG. 4 shows an alternative manner in accordance with an aspect of the invention in which a single conductor may advantageously be attached to a magnetostrictive rod and utilized to sense a plurality of information cells in a magnetizable medium. The elements shown in FIG. 4 are identical to those in FIG. 3 except that conductor 38 which is attached to magnetostrictive rod 34 is helically wound about rod 34 rather than being looped over to provide half windings in the manner of conductor 35 in FIG. 3. The pitch of the winding of conductor 38 may advantageously be selected such that one or more turns of conductor 38 will link the flux lines emanating from respective cells 31 through 33 of magnetizable medium 30. When an acoustic wave is launched in rod 34 in the manner described hereinbefore, successive turns of conductor 38 will be displaced to cut the magnetic flux lines emanating from respective cells of medium 30. Thus, for example, when the acoustic wave propagates past the turns of conductor 38 which link the magnetic flux lines emanating from cell 31, these turns are displaced to cut these flux lines and induce a voltage pulse in conductor 38. This pulse is amplified in amplifier 36 and applied to utilization circuit 37. As the acoustic wave propagates on further down rod 34, the turns formed by conductor 38 which link the magnetic flux lines emanating from cell 32 will be displaced and will cut these flux lines to induce a second voltage pulse in conductor 38. A similar action takes place when the acoustic wave propagates further down rod 34 and displaces the turns formed by conductor 38 which link the lines of flux emanating from cell 33. Thus as the acoustic wave propagates the length of rod 34 shown in FIG. 4, three successive voltage pulses will be amplified in amplifier 36 and applied to utilization circuit 37. The polarity of these successive pulses will indicate respectively the values of the binary bits recorded in the respective cells 31, 32 and 33 of magnetizable medium 30.

Figure 5:
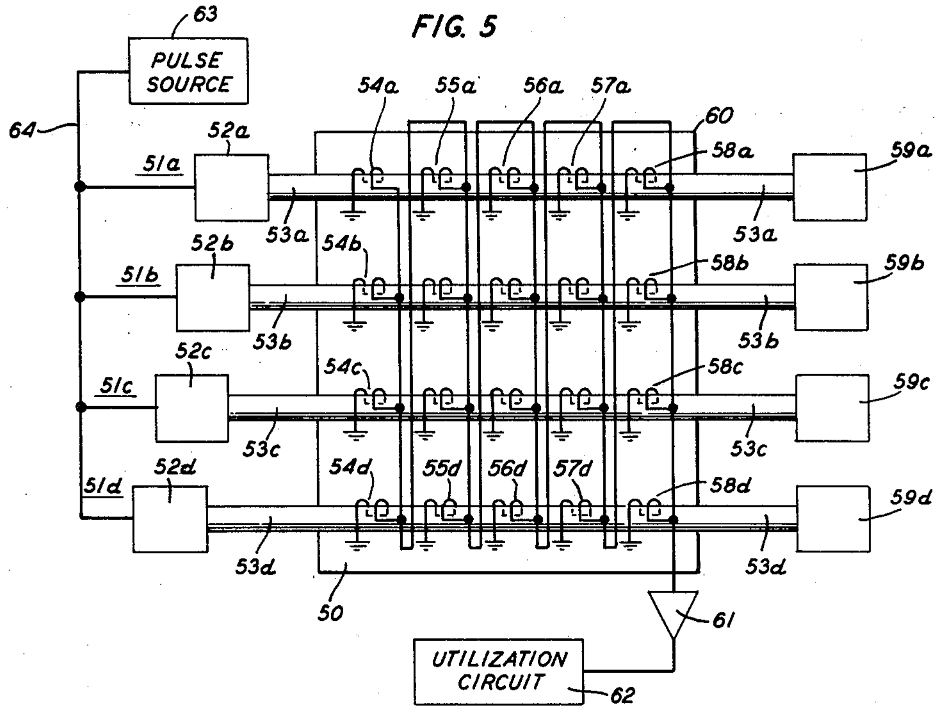
FIG. 5 depicts an illustrative embodiment in accordance with an aspect of the invention where information recorded on a magnetizable medium on a "bit organized" basis is sequentially read a bit at a time.

In accordance with another aspect of the invention, binary information recorded in information cells of a magnetizable medium on a "bit organized" basis may advantageously be read a cell at a time without relative lateral motion between the magnetizable medium and transducer structures. An illustrative embodiment of this aspect is shown in FIG. 5 and comprises a magnetizable medium 50 which may advantageously be a thin plate or thin film of magnetizable material. Binary information is recorded on medium 50 in the manner described hereinbefore in cells arranged in rows left to right in FIG. 5, and columns top to bottom in FIG. 5. A plurality of transducer structures 51*a* through 51*d*, each similar to that described in connection with FIG. 1, are positioned adjacent a respective row of information cells in medium 50. Each of these transducer structures comprises an electromechanical transducer, a magnetostrictive rod with a plurality of conductors attached thereto, and a nonreflective termination. For example, transducer structure 51*a* comprises electromechanical transducer 52*a* attached to one end of a magnetostrictive rod 53*a* upon which are positioned a plurality of conductors 54*a* through 58*a* and a non-reflective termination 59*a* attached to the other end of rod 53*a*. The respective conductors 54*a* through 58*a* are attached to rod 53*a* in the manner similar to that described above in connection with FIG. 2 and are positioned with respect to medium 50 such that the two oppositely wound half windings formed by each conductor link the magnetic flux lines emanating from a respective cell in medium 50. The remaining transducer structures 51*b* through 51*d* each comprises corresponding elements and the electrical conductors of each are positioned in a similar manner to link the magnetic flux lines emanating from a respective cell in medium 50. The respective conductors 54*a* through 58*a*, 54*b* through 58*b*, etc., of each of the transducer structures 51*a* through 51*d* are parallelly interconnected on a columnar basis in the manner shown in FIG. 5 by conductor 60 and connected to the input of amplifier 61. The output of amplifier 61 is connected to utilization circuit 62. Pulse source 63 provides electrical pulses which are simultaneously applied via lead 64 to the respective electromechanical transducers 52*a* through 52*d* to launch acoustic waves in the respective magnetostrictive rods 53*a* through 53*d* to read the information recorded in magnetizable medium 50.

It will be noted that magnetostrictive rods 53*a* through 53*d* are progressively greater in length starting with rod 53*a* from the position of the respective electromechanical transducers 52*a* through 52*d* to the respective conductors 54*a* through 54*d* attached thereto. Thus when the electromechanical transducers 52*a* through 52*d* are simultaneously energized the acoustic wave propagating down the respective rods 53*a* through 53*d* will arrive at conductors 54*a* through 54*d* at different points in time. In this manner conductors 54*a* through 54*d* of the respective transducer structures 51*a* through 51*d* are successively displaced to cut the magnetic lines of flux emanating from their respective cells of medium 50 to cause successive voltage pulses to be applied to conductor 60. These successive pulses are amplified in amplifier 61 and applied to utilization circuit 62. As the acoustic pulses continue to propagate down the respective rods 53*a* through 53*d*, a succeeding series of voltage pulses will be induced in respective conductors 55*a* through 55*d* and applied to conductor 60. Similarly, conductors 56*a* through 56*d* are successively displaced as the acoustic pulses in the respective rods 53*a* through 53*d* continue to propagate down the rods. A similar action takes place in the other columnar connected electrical conductors of the respective transducer structures 51*a* through 51*d*. Thus it will be observed that as the acoustic pulses propagate from the electromechanical transducers 52*a* through 52*d* down the entire length of the respective rods 53*a* through 53*d*, all of the information recorded in the medium 50 will be sequentially read in a serial manner column by column and applied to utilization circuit 62 as a series of voltage pulses, the polarity of which indicates the binary value read in the respective cells of magnetizable medium 50. The maximum time required to read successively all of the binary bits recorded in medium 50 thus corresponds to the time for an acoustic wave to propagate the length of rod 53*d*. Furthermore, with the proper selection of the length of the respective rods 53*a* through 53*d* the voltage pulses applied to lead 60 as the successive cells are read are advantageously equally spaced in time.

Alternatively, the rods 53*a* through 53*d* in the embodiment shown in FIG. 5 may advantageously be made of uniform length and the successive displacement of the serially connected conductors 54*a* through 54*d*, 55*a* through 55*d*, et cetera, may be accomplished by successively energizing the respective electromechanical transducers 52*a* through 52*d*. For example, each of the electromechanical transducers 52*a* through 52*d* may be individually connected to a multiphase pulse source wherein the relative phase of the pulses individually applied to the respective transducers is controlled to energize successively the respective transducers and successively launch acoustic waves in the respective rods 53*a* through 53*d*. Alternatively, an electrical pulse from a pulse source such as pulse source 63 may be successively delayed in electrical delay circuits in the manner known in the art and successively applied to electromechanical transducers 52*a* through 52*d* to effect the successive energization thereof.

Figure 6:
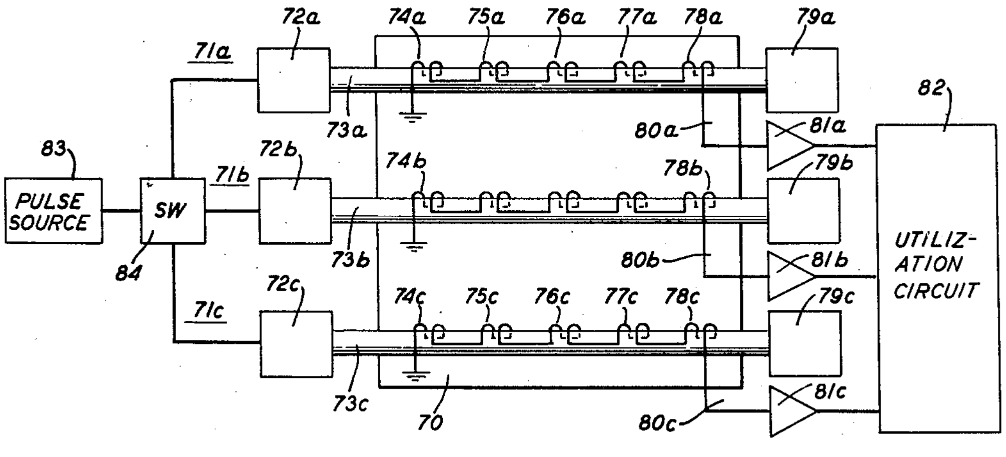
FIG. 6 depicts an illustrative embodiment in accordance with another aspect of the invention where information recorded on a magnetizable medium is read on a "word organized" basis.

As indicated hereinbefore, another aspect of the invention is directed to reading information in a magnetizable medium wherein the information cells are arranged in rows and columns on a "word organized" basis with each row of cells containing the binary bits of each word. An illustrative embodiment of this aspect is shown in FIG. 6 and comprises a magnetizable medium 70 which may advantageously be a thin plate or thin film of magnetizable material. Binary information is recorded on medium 70 in the manner described hereinbefore in cells arranged in rows, left to right in FIG. 6, and columns, top to bottom in FIG. 6, on a "word organized" basis such that each row of cells contains the binary bits of a respective word stored in medium 70. A plurality of transducer structures 71*a* through 71*c*, each similar to that described in connection with FIG. 1, are positioned adjacent a respective row of information cells in medium 70. Each of these transducer structures comprises an electromechanical transducer, a magnetostrictive rod with a plurality of conductors attached thereto, and a nonreflective termination. For example, transducer structure 71*a* comprises electromechanical transducer 72*a* attached to one end of magnetostrictive rod 73*a* upon which are positioned a plurality of conductors 74*a* through 78*a* and a nonreflective termination 79*a* attached to the other end of rod 73*a*. The respective conductors 74*a* through 78*a* are attached to rod 73*a* in a manner similar to that described in connection wtih FIG. 3 and are serially interconnected by a conductor 80*a* which extends to the input of an associated amplifier 81*a*. The output of amplifier 81*a* is applied to utilization circuit 82. The two oppositely wound half windings formed by each of the conductors 74*a* through 78*a* link the magnetic flux lines emanating from a respective cell in the associated row in medium 70. The remaining transducer structures 71*b* and 71*c* each comprises elements corresponding to those described above for transducer structure 71*a* and each is connected respectively through an associated amplifier 81*b* and 81*c* to utilization circuit 82. Pulse source 83 provides electrical pulses for launching acoustic waves in transducer structures 71*a* through 71*c*. The output of pulse source 83 is applied to switch 84 which controls the selective application of electrical pulses to the transducer structures 71*a* through 71*c*. Thus if it is desired to read the word recorded in the top row of cells in medium 70, switch 84 will be controlled to apply an electrical pulse from pulse source 83 to the electromechanical transducer 72*a* of transducer structure 71*a*. When the acoustic wave propagates the length of rod 73*a*, the conductors 74*a* through 78*a* attached thereto will be successively displaced as described hereinbefore and will apply successive voltage pulses via lead 80*a* through amplifier 81*a* to utilization circuit 82. The polarity of these respective pulses will indicate the binary values of the respective bits of the word recorded in the top row of cells. Switch 84 may advantageously be operated to select any desired word recorded in medium 70. Switch 84 may also advantageously be controlled to apply current pulses simultaneously to all of the electromechanical transducers 72*a* through 72*c* to read successively each of the bits of all of the words stored in medium 70 in parallel.

It is understood that the above-described arrangements are merely illustrative of the application of the principles of the invention. Numerous other arrangements may be devised by those skilled in the art without departing from the spirit and scope of the invention.

What is claimed is:

1. In a magnetic data storage system the combination comprising a surface of magnetizable material wherein binary information is stored as remanent magnetic flux conditions in an incremental area, a member separate from said surface and having mechanical wave propagating characteristics, an electrical conductor attached to said member such that changes in the dimensions of said member will cause displacement of portions of said conductor, said member positioned such that said conductor is positioned adjacent said area to link the magnetic flux emanating therefrom, and means for propagating a mechanical wave in said member to cause changes in said dimensions of said member, said changes causing displacement of said conductor portions to cause said conductor portions to cut said flux and thereby to induce a signal therein.

2. In a magnetic data storage system transducing means for reading data stored as remanent flux conditions in a magnetizable storage medium comprising an elongated member separate from said medium and having magnetostrictive properties, an electrical conductor attached to said member such that changes in the dimensions of said member will cause movement of portions of said conductor, said member positioned such that said conductor is positioned adjacent said medium to link the magnetic flux emanating from said medium, means for propagating an acoustic wave in said member to cause changes in said dimensions and consequent movement of said conductor portions through said flux as said wave propagates past said conductor portions and thereby to induce a voltage in said portions corresponding to said stored data, and means for detecting the voltage.

3. In a magnetic data storage system including a surface of magnetizable material wherein information is recorded as remanent magnetic flux conditions in incremental areas, means for sequentially sensing a plurality of said areas comprising an elongated member positioned separate from and adjacent said surface, a plurality of electrical conductor portions attached to respective segments of said member such that changes in the radial cross section of segments of said member will cause displacement of said conductor portions, each of said conductor portions associated with a respective one of said areas and positioned in the magnetic flux emanating therefrom, means for changing the radial cross section of successive segments of said member to cause successive displacements of said conductor portions, said conductor portions cutting the magnetic flux emanating from the respective areas of said medium to induce in said conductor portions voltage pulses, and means for detecting said induced voltage pulses.

4. The combination defined in claim 3 wherein said elongated member possesses mechanical wave propagating characteristics and wherein said cross section changing means comprises means for propagating a mechanical wave in said member.

5. The combinaion defined in claim 4 wherein said elongated member has substantial magnetostrictive properties and wherein said mechanical wave propagating means comprises an electromechanical transducer connected to said member and means for controlling said transducer to cause propagation of an acoustic wave in said member.

6. In a magnetic data storage system including a surface of magnetizable material wherein information is recorded as remanent magnetic flux conditions in incremental areas, means for sequentially sensing a plurality of said areas comprising an elongated member separate from said surface and possessing mechanical wave propagating characteristics, a plurality of electrical conductor portions attached to segments of said member such that changes in the radial dimensions of said segments of said member will cause displacements of said portions of said conductor, said member positioned such that each of said conductor portions is positioned in the magnetic flux emanating from a respective one of said plurality of areas, means for propagating a mechanical wave in said member to cause changes in the radial dimensions of particular segments thereof thereby to displace particular associated portions of said conductor, said conductor portions cutting magnetic fluxes emanating from said plurality of areas thereby to induce particular valued voltages in said conductor portions corresponding to said information as said wave passes the segments of said member and associated conductor portions corresponding to particular said areas, and means for detecting said induced voltages.

7. In a magnetic data storage system including a surface of magnetizable material wherein information is recorded as remanent magnetic flux conditions in incremental areas, means for sequentially sensing a plurality of said areas comprising an electrical conductor helically wound to form a plurality of turns, means separate from said surface for positioning said conductor with respect to said surface such that at least one turn thereof links the magnetic flux emanating from a respective one of said plurality of areas, said conductor being attached to said positioning means such that changes in the dimensions of said positioning means will cause displacement of said conductor, means for successively changing the dimensions of said positioning means thereby to displace the turns of said helically wound conductor and to cut successively the magnetic flux emanating from the respective ones of said plurality of areas, and means for detecting voltage pulses successively induced in said conductor as said turns formed by said conductor are successively displaced.

8. The combination defined in claim 7 wherein said means for positioning said conductor is an elongated rod having substantial magnetostrictive properties to which said conductor is attached, and wherein said means for successively displacing the turns of said helically wound conductor comprises an electromechanical transducer connected to said rod and means for controlling said transducer to propagate an acoustic wave in said rod.

9. In a magnetic data storage system including a surface of magnetizable material wherein information is recorded as remanent magnetic flux conditions in incremental area, said areas being arranged in said surface in a coordinate array of rows and columns, means for sequentially sensing all of said areas in said array comprising a plurality of electrical conductors each associated with a respective one of said areas and positioned in the magnetic flux emanating therefrom, circuit means parallelly interconnecting in a columnar manner said coductors associated with the respective columns of said array, means separate from said surface for successively displacing each of said parallely interconnected conductors to cut successively the magnetic flux emanating from the associated one of said areas, said conductors being attached to said last-mentioned means such that changes in the dimensions of said last-mentioned means will cause displacements of said conductors, and means for detecting voltage pulses successively applied to said circuit means as each of said parallelly interconnected conductors is successively displaced.

10. In a magnetic data storage system including a surface of magnetizable material wherein information is recorded as remanent magnetic flux conditions in incremental areas, said areas being arranged in said surface in a coordinate array of rows and columns, means for sequentially sensing all of said areas in said array in a columnar manner comprising a plurality of elongated members separate from said surface and possessing mechanical wave propagating characteristics, each of said members positioned adjacent a respective one of said rows of areas, a plurality of groups of electrical conductors, each of said groups of conductors being attached to a respective one of said members such that changes in the dimensions of said member will cause displacements of an associated group of conductors and positioned such that each of the conductors is in the magnetic flux emanating from a respective one of said areas, circuit means parallelly interconnecting in a columnar manner the respective coductors of said groups of conductors associated with respective columns of areas of said array, means for propagating mechanical waves in all of said members to displace successively said parallelly interconnected electrical conductors, said displaced conductors cutting corresponding magnetic fluxes thereby to induce voltage pulses in said conductors, and means connected to said circuit means for detecting said voltage pulses.

11. In a magnetic data storage system including a surface of magnetizable material wherein information is recorded as remanent magnetic flux conditions in incremental areas, said areas being arranged in said surface in a coordinate array of rows and columns and said information being recorded on a "word organized" basis with each row of areas containing the binary bits of each word, means for selectively reading the words stored in the respective rows of areas in said array comprising a plurality of electrical conductors each associated with a respective one of said rows of areas and positioned with respect thereto such that successive portions of said conductors respectively link the magnetic flux emanating from successive areas of the row associated therewith, means separate from said surface for successively displacing the successive portions of a selected one of said conductors to cut successively the magnetic flux emanating from the successive areas of the row associated therewith thereby inducing in said selected conductor portions particular valued voltages corresponding to said recorded information, said last-mentioned means comprising a plurality of magnetostrictive rods, said plurality of conductors attached to said rods such that changes in the radial dimensions of successive segments of said rods will cause successive displacements of said conductors, and means for detecting said induced voltages.

12. In a magnetic data storage system including a surface of magnetizable material wherein information is recorded as remanent magnetic flux conditions in incremental areas, said areas being arranged in said surface in a coordinate array of rows and columns and said information being recorded on a "word organized" basis with each row of areas containing the binary bits of each word, means for selectively reading the words stored in the responsive rows of areas in said array comprising a plurality of transducer structures each associated with a respective one of said rows of areas, each of said transducer structures comprising an elongated member separate from said surface and possessing mechanical wave propagating characteristics, an electrical conductor attached to said member such that changes in the radial dimensions of successive segments of said member will cause movements of successive portions of said conductor, said member positioned such that successive portions of said conductor respectively link the magnetic flux emanating from successive areas of the row associated therewith, and an electromechanical transducer attached to said member, a source of pulses, means including said electromechanical transducer and responsive to said source of pulses for launching a mechanical wave in said elongated member to successively displace successive portions of an electrical conductor associated with a selected row containing a desired word, and means for detecting voltage pulses induced in the electrical conductor of the selected transducer structure as each successive portion of the said electrical conductor is successively displaced.

13. In a magnetic data storage system including a surface of magnetizable material wherein information is recorded as remanent magnetic flux conditions in incremental areas, said areas being arranged in said surface in a coordinate array of rows and columns and said information being recorded on a "word organized" basis with each row of areas containing the binary bits of each word, means for selectively reading the words stored in the respective rows of areas in said array comprising a plurality of electrical conductors each associated with a respective one of said areas in said array and positioned in the magnetic flux emanating therefrom, a plurality of circuit means each serially interconnecting the conductors associated with a respective one of said rows of said array, means separate from said surface for successively displacing the conductors associated with a selected row of said array to cut successively the magnetic flux emanating from the areas associated therewith, thereby to induce in said conductors selected values of voltages corresponding to said information, said separate means comprising a plurality of elongated rods having substantial magnetostrictive properties, each of said rods associated with a respective one of said rows of areas, said serially interconnected conductors attached to said rod such that changes in the radial dimensions of said rods will cause displacements of said conductors, and means for detecting said selected values of voltages.

14. The combination defined in claim 13 wherein said means for successively displacing the conductors associated with a selected row of said array comprises means for propagating an acoustic pulse in the selected elongated rods.

References Cited in the file of this patent

UNITED STATES PATENTS

| | | |
|---|---|---|
| 2,612,603 | Nicholson | Sept. 30, 1952 |
| 2,736,881 | Booth | Feb. 28, 1956 |
| 2,790,160 | Millership | Apr. 23, 1957 |